April 9, 1968
AKINORI MUTA
3,377,597
RECORDER FOR ANALYZING PARTICLE SIZE
DISTRIBUTIONS OF POWDERS
Filed Dec. 8, 1965
2 Sheets-Sheet 1
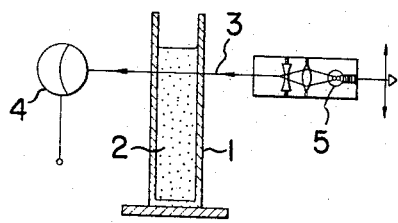
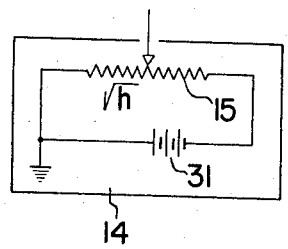
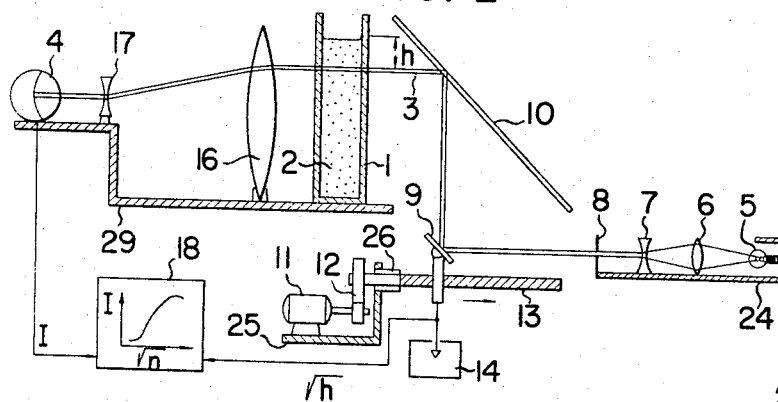
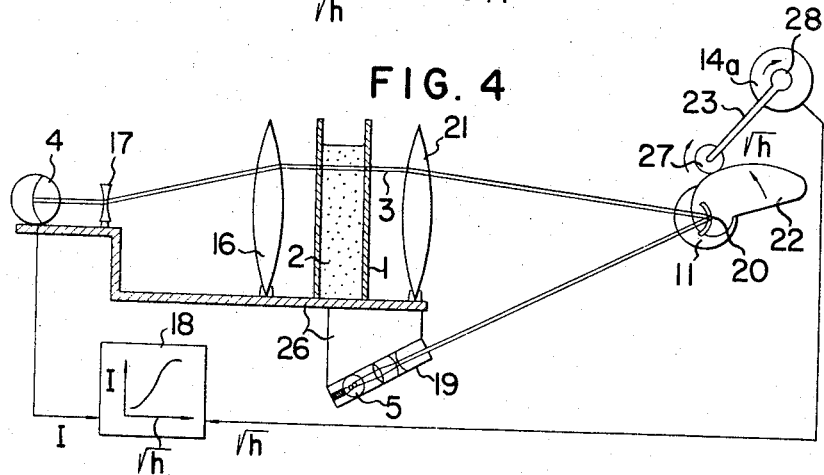

United States Patent Office 3,377,597
Patented Apr. 9, 1968

3,377,597
RECORDER FOR ANALYZING PARTICLE SIZE DISTRIBUTIONS OF POWDERS
Akinori Muta, Tokyo-to, Japan, assignor to Kabushiki Kaisha Hitachi Seisakusho, Tokyo-to, Japan, a joint-stock company of Japan
Filed Dec. 8, 1965, Ser. No. 512,320
Claims priority, application Japan, Dec. 10, 1964, 39/69,114
1 Claim. (Cl. 346—33)

ABSTRACT OF THE DISCLOSURE

A particle size distribution curve is obtained from the relationship of I versus $\sqrt{h}$ curve between the transmitted parallel light beam intensity I through cell provided with powder to be analyzed in the liquid and the square root of distance $h$ projected from liquid surface, wherein I versus $\sqrt{h}$ curve is transformed graphically to Log I versus $r$ curve, and the relationship of particle size $r$ versus distribution $W(r)$ is obtained briefly from graphical integrations of Log I versus $r$ curve in the absence of computer or other complicated and expensive means.

This invention relates to improvements in or relating to a photo-scanning method for analyzing particle size distributions by the sedimentation technique based on U.S. Patent 3,315,066.

More specifically, the invention relates to a new apparatus resulting from an improvement of the analyzer according to the above mentioned patent and to a new method for efficiently analyzing particle size distributions by using said apparatus in conjunction with a new nomographic recording sheet for nomographical determination of particle size distribution.

Each of the known optical methods for analyzing particle size distributions by the sedimentation technique essentially comprises: placing a liquid suspension in which particles of a powder have been uniformly dispersed in a cell having mutually parallel, transparent side walls; projecting a thin light beam of parallel rays which is perpendicular to said side walls and, at the same time, parallel to the suspension liquid surface at a point at a certain depth from the liquid surface; receiving the resulting transmitted light by means of a photoelectric converter; obtaining as a photoelectric output the variation with time of the transmitted light intensity, which varies in accordance with the sedimentation of the particles; recording by a suitable method a curve of the relationship between the transmitted light intensity, that is, the particle concentration, and time; and further analyzing this curve to obtain a particle size distribution curve.

This known method has a number of inconvenient features, such as the substantial time required for settling of the particles in the suspension and the difficulty in carrying out efficiently the analytical procedure of determining the desired particle size distribution from the curve indicating the relationship between the powder concentration and time.

While the invention of the aforementioned patent has the object of eliminating the above mentioned inconvenient features, it entails the disadvantage of expensive computing apparatus as will be more fully described hereinafter.

It is a general object of the present invention to eliminate the disadvantages accompanying the aforementioned known methods and the aforementioned previous invention relating to measurement of particle size distributions.

More specifically, an object of the invention is to provide a new method and apparatus for analyzing particle size distributions wherein the constitution, in principle, of the aforementioned previous invention is retained and utilized in an improved form, and, by the use of a new nomographical determination recording sheet for analyzing particle size distributions according to the invention instead of expensive computation apparatus, desired particle size distributions can be efficiently obtained.

According to the present invention, briefly stated, there is provided a photo-scanning method for determining particle size distribution of powder which comprises: preparing a liquid suspension of a powder sample to be analyzed; placing the liquid suspension in a cell with transparent side walls; agitating the liquid suspension and then stopping agitation at a certain time instant; causing a parallel light beam parallel to the surface of the liquid suspension to scan the liquid suspension through the transparent walls of the cell downwardly in the depth direction of the suspension at an arbitrary time after said time instant; simultaneously receiving the resulting transmitted light by means of a photoelectric converter to produce a first electrical output corresponding to the transmitted light intensity; obtaining a second electrical output corresponding to the square root of a linear variable representing the varying scanning position of the parallel light beam; and causing said first and second electrical outputs to be plotted as coordinates on the graph sheet of a coordinate (X–Y) recorder and using the curve recorded on said nomographic sheet which comprises respectively one of said coordinates with the scales for direct conversion of values of the transmitted light intensity into logarithms of said values, and the other of said coordinates with the scales of the square root of the parallel light beam scanning position corresponding to particle diameter of the sample.

According to the present invention there is further provided an apparatus for practicing the above described method according to the invention.

According to the present invention there is additionally provided a nomographic recording sheet for particle size distribution measured by photo-scanning, said recording sheet being adapted for use in the coordinate (X–Y) recorder in the above stated apparatus and having inscribed on the coordinate plane thereof rectangular coordinates, one of said coordinates comprising parallel scales for direct conversion of values of the transmitted light intensity into logarithms of said values, and the other of said coordinates comprising parallel scales respectively of the square root of the parallel light beam scanning position and of the corresponding particle diameter, whereby a weight distribution curve with respect to particle sample size can be efficiently obtained.

The nature, principle, and details of the invention will be more clearly apparent from the following detailed description when taken in conjunction with the accompanying drawings in which like parts are designated by like reference numerals, and in which:

FIG. 1 is a schematic diagram in elevation indicating the composition and arrangement in principle of a particle size distribution analyzer of photo-scanning type;

FIGS. 2 and 4 are schematic diagrams in elevation respectively indicating preferred embodiments of the apparatus and method for analysis of particle size distributions according to the invention;

FIG. 3 is a circuit diagram showing particularly an apparatus part according to the invention for converting scanning position $h$ into electrical output proportional to $\sqrt{h}$;

Figure 5:
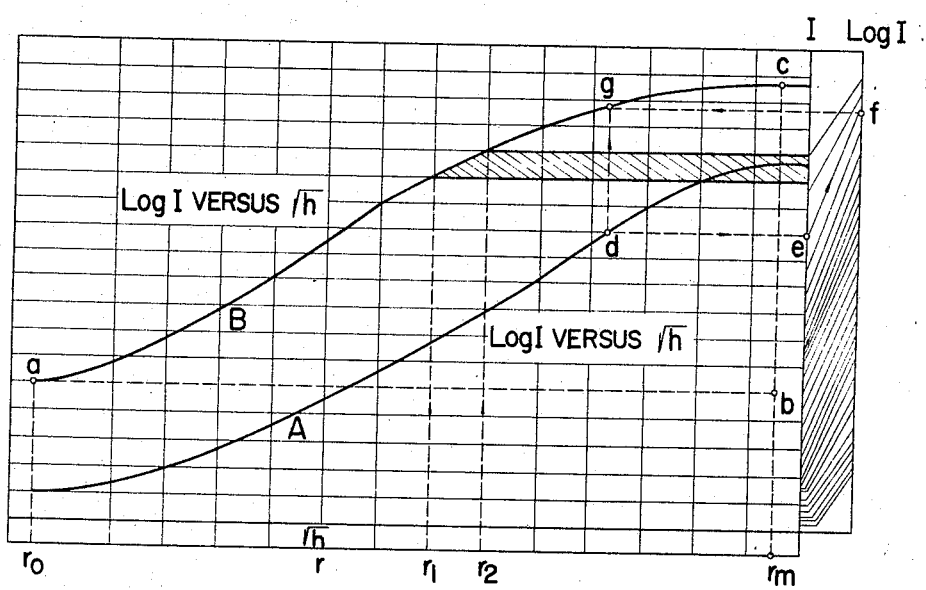
FIG. 5 is a planar view showing an example of recording sheet for nomographical determination suitable for use in the practice of the method according to the invention.

The invention of U.S. Patent 3,315,066 relates to a method for analyzing particle size distributions which comprises, as indicated in FIG. 1: placing a liquid suspension 2 containing uniformly dispersed particles in a cell 1 having mutually parallel, transparent side walls; projecting a thin parallel-ray light beam 3 from a light source 5 perpendicularly through the cell side walls and in parallel to the liquid surface; causing this light beam to scan the suspension liquid from the liquid surface downwardly in the depth direction in a short time period beginning at an instant at an arbitrary time after the start of sedimentation of the suspended particles; detecting and measuring as an electrical output the intensity of the transmitted light by means of a photoelectric converter 4 on the side of the cell opposite to that of the light source; and obtaining the particle size distribution from the electrical output and the scanning position of the parallel-ray light beam.

The theoretical basis of the above stated invention is as follows: First, if it is assumed that the transmitted light intensity is related to the total cross sectional area of the particles and that the absorption of light by the cell walls and the liquid can be neglected, the following relationship can be obtained.

$$\log \frac{Io}{I} = \pi l \int_0^r r^2 c(r) dr \quad (1)$$

where:

$Io$ is the incident light intensity;
$I$ is the transmitted light intensity;
$l$ is the thickness of the body of the suspension;
$r$ is the particle radius; and
$n(r)$ represents the number distribution of the particles.

Furthermore, the following equation is obtained from Stokes' law.

$$r = \sqrt{\frac{9\eta h}{2g(\rho d - \rho m)t}} = \sqrt{k_1 h} \quad (2)$$

where:

$\eta$ is the coefficient of viscosity of the liquid in which the particles are suspended;
$\rho d$ is specific gravity of the particles;
$\rho m$ is the specific gravity of the liquid containing the particles; and
$h$ denotes the depth through which the particles of radius $r$ settle during a time $t$ after stirring.

$$k_1 = \frac{9\eta}{2g(\rho d - \rho m)t}$$

and if the time $t$ is made constant, $k_1$ will become constant.

When Equation 1 is differentiated with respect to $r$, and Equation 2 is substituted thereinto, the number distribution $n(r)$ becomes as follows:

$$n(r) = -\frac{2}{\pi l} \cdot \frac{1}{r^3} \cdot \frac{dI}{dh} \cdot \frac{h}{I} \quad (3)$$

Furthermore, the weight particle size distributed $W(r)$ becomes as follows:

$$W(r) = \frac{4}{3}\pi r^3 \rho d n(r) \quad (4)$$

From Equations 3 and 4, the following equations are obtained.

$$W(r) = -\frac{8\rho d}{3l} \cdot \frac{dI}{dh} \cdot \frac{h}{I} = -k_2 \frac{dI}{dh} \cdot \frac{h}{I} \quad (5)$$

where $$k_2 = \frac{8\rho d}{3l} = \text{a constant}$$

Since a curve of $W(r)$ versus $r$ here represents a particle size distribution curve, a particle side distribution curve of the sample is determined by $$-\frac{dI}{dh} \cdot \frac{h}{I}$$

versus $r$ from the relationship indicated in Equation 5.

The above described theoretical result was utilized in practical form by the aforementioned previous invention, wherein, by converting into an electrical output the position $h$ of the parallel-ray light beam 3 scanning for a short time in the depth direction of the cell 1 in which the suspension liquid 2 is placed as shown in FIG. 1, providing a first computation circuit for computing the particle radius $r$ by Equation 2 from said electrical output, receiving by means of a photoelectric converter 4 the parallel-ray light beam which has been transmitted through the cell 1 to produce an output I, providing a second computation circuit for computing the particle size weight distribution $W(r)$ of the particles in accordance with Equation 5 from the output I and position $h$ of the parallel light beam, and causing the respective outputs of the first and second computation circuits to be recorded in a recorder such as an X–Y recorder, the desired particle size distribution curve ($W(r)$ versus $r$) is automatically determined.

The above described invention has the advantage of affording automatic recording on a recording sheet of a desired particle size distribution curve in a very short time but has the disadvantage of entailing substantially high cost for computation devices for practically producing the above said particle size distribution curve.

The nature of the present invention, in which the above disadvantage as well as those of prior methods and apparatus are overcome, will now be described in detail with respect to an analytical consideration and to preferred embodiments of the invention.

First, the weight $W(r_1$ to $r_2)$ of particles in the range ($r_1$ to $r_2$) of particle radius may be determined by computation by integrating Equation 5 between the limits of $r_1$ and $r_2$, as follows:

$$W(r_1 \text{ to } r_2) = \int_{r_1}^{r_2} W(r) dr$$
$$= -k_2 \int_{r_1}^{r_2} \frac{dI}{dh} \cdot \frac{h}{I} \cdot dr$$
$$= -k_2 \int_{r_1}^{r_2} \frac{d(\log I)}{dh} \cdot h \cdot dr \quad (6)$$

Then, by substituting $$dr = \frac{\sqrt{k_1}}{2} \cdot \frac{dh}{\sqrt{h}}$$

obtained from Equation 2 into the above Equation 6, the following equation is obtained.

$$W(r_1 \text{ to } r_2) = -k_3 \int_{r_1}^{r_2} \sqrt{h} \cdot d(\log I) \quad (7)$$

where, $$k_3 = -\frac{k_2 \sqrt{k_1}}{2} = \text{a constant}$$

When the minimum and maximum radii of the particles are denoted respectively by $r_0$ and $r_m$, the weight of all particles $W(r_0$ to $r_m)$ is given by $$W(r_0 \text{ to } r_m) = -k_3 \int_{r_0}^{r_m} \sqrt{h} \cdot d(\log I)$$

and the weight ratio $\omega(r_1$ to $r_2)$ of the particles in the radius range ($r_1$ to $r_2$) is expressed by the following equation.

$$\omega(r_1 \text{ to } r_2) = \frac{\int_{r_1}^{r_2} \sqrt{h}\, d(\log I)}{\int_{r_0}^{r_m} \sqrt{h}\, d(\log I)} \qquad (8)$$

From this relationship, it was found that the weight ratio of the particles in the radius range of ($r_1$ to $r_2$) can be determined as the ratio of the partial area corresponding to the range ($r_1$ to $r_2$) to the total area under a curve of log I versus $\sqrt{h}$.

The principal feature of the present invention lies in a method and apparatus for embodying the above obtained theoretical result, said method and apparatus being characterized in that, by obtaining the scanning position $h$ of the aforementioned parallel-ray beam directly as an electrical output $\sqrt{h}$ and receiving the aforementioned transmitted light by means of a photoelectric converter to obtain an output I thereof, a curve of I versus $\sqrt{h}$ can be obtained and in that use is made of a nomographical determination recording sheet on which graphical conversion from the I-versus-$\sqrt{h}$ curve to a log I-versus-$\sqrt{h}$ curve can be accomplished for the purpose of carrying out the abovementioned integration of Equation 8.

In one embodiment of the invention as shown in FIG. 2, light is supplied from a light source 5 through a lens system 6 and 7 and a scattering light shield 8 with a slit for controlling the light beam width, all said parts being fixedly mounted on a base plate 24. The light thus supplied is directed as a parallel light beam 3 perpendicularly to and through the aforementioned cell 1 by plane mirrors 9 and 10 capable of being angularly adjusted. The plane mirror 9 is caused by the rotation of a screw shaft 13 to which it is coupled to travel in the indicated arrow direction, the screw shaft 13 being rotatably supported by a bearing 26 and being driven through a gear 12 by a motor 11 fixedly mounted on a base plate 25, whereby the parallel light beam 3 is caused to scan the liquid suspension 2 within the cell 1 downwardly in the depth direction.

The screw shaft 13 is made with threads of constant pitch, and the mirror 9 is connected to the sliding contact of a potentiometer 15 of a converter 14 having a constant-voltage source 31 as shown in FIG. 3, the potentiometer winding being so wound that the potentiometer resistance will be equal to $\sqrt{h}$. Accordingly, the scanning position of the parallel light beam 3 can be obtained as an electrical output $\sqrt{h}$.

In the operation of this apparatus shown in FIG. 2, the particles are uniformly dispersed as a suspension in the liquid in the cell 1 having transparent walls, and then the parallel light beam 3 is caused to scan this suspension, the resulting transmitted light being passed through a condensing lens system 16 and 17 mounted on a base plate 29 and then received by a photoelectric converter 4. The electrical output I of this photoelectric converter 4 and the output $\sqrt{h}$ corresponding to the scanning position of the parallel light beam are plotted by an X–Y coordinate axes recorder 18, whereby an I-versus-$\sqrt{h}$ curve is obtained.

FIG. 4 shows another embodiment of the invention having the same object and effect as those of the example shown in FIG. 2 but differing from the example shown in FIG. 2 in the manner in which the electrical output $\sqrt{h}$ with respect to the scanning position of the parallel light beam is obtained.

In this apparatus, there is provided a device 19 for projecting light from a light source 5 as a narrow light beam onto a concave mirror 20 which is rotated by a motor 11, and the light beam reflected by the mirror 20 is projected by a lens 21 as a parallel light beam 3 perpendicularly through the side walls of the cell 1, the intensity of the light so transmitted being received by a photoelectric converter 4 and obtained as an electrical output in the same manner as in the preceding example.

On one hand, a square-root cam 22 coupled directly to the rotor shaft of the motor 11 is thereby rotated, whereby a follower roller 27 provided at the free end of a crank arm 23 is caused to roll along the peripheral surface of the cam 22. Consequently, the crank arm 23, which is fixed at its other end to the rotating shaft 28 of a potentiometer 14a having a linear characteristic, rotates the shaft 28 thereby to change the resistance value of the potentiometer. The change in the resistance value is thereby obtained as an electrical output proportional to the square root of the position $h$ of the parallel light beam 3 ($\sqrt{h}$).

From the relationship between the output $h$ with respect to the parallel light beam scanning position $h$ and the output I of the photoelectric converter corresponding to the transmitted light intensity in each of the above described apparatuses, that is, the I-versus-$\sqrt{h}$ curve, and through the use of a nomographical determination recording sheet, the particle size distribution curve of each particle sample is determined by the practice of the present invention in the following manner.

An example of a nomographical determination recording sheet according to the invention for determining the particle size distribution curve is illustrated in FIG. 5, in which the abscissa represents $\sqrt{h}$, and the ordinate represents I and log I. All variables are laid out to suitable scales so that the direct conversion from I to log I can be made.

Curve A indicates the relationship (I versus $\sqrt{h}$) traced directly on the nomographical determination recording sheet from the aforementioned X–Y recorder. By carrying out the graphical conversion I-to-log I of the ordinates as indicated by the arow-direction dotted lines $d \to e \to f \to g$ and $d \to g$, the curve B representing the relationship (log I versus $\sqrt{h}$) can be readily determined.

Figure 6:
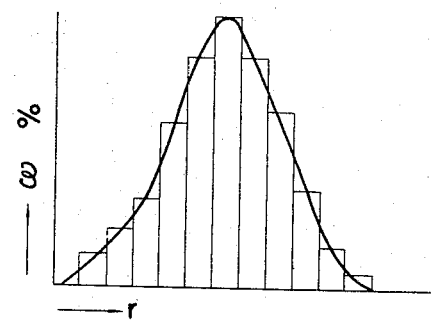
FIG. 6 is a graphical representation indicating a weight particle size distribution curve with respect to particle radius.

Then, by laying out as a horizontal axis in the same graph a scale of particle radius $r$ with a correspondence to $h$ established in accordance with the relationship indicated by Equation 2, the weight ratio of the particles in the radius range of $r_1$ to $r_2$ can be determined as the ratio of the area of the cross-hatched part to the total area enclosed by enclosure $a$–$b$–$c$–$a$ under the log I-versus-$\sqrt{h}$ curve in accordance with Equation 8. By measuring these areas by means of a planimeter or by simple graphical integration and calculating the above mentioned area ratios for all ranges of particle radius, a weight particle size distribution curve with respect to particle radius as shown in FIG. 6 can be produced.

By the practice of the present invention, wherein the photoscanning analyzer for particle size distribution and the recording sheet for graphical solution of particle size distribution according to the invention are used, there is afforded the advantage of low cost of apparatus which is of the order of ⅕ of that of the apparatus of the aforementioned previous invention in which a computing device is provided.

Furthermore, the present invention affords a substantial shortening of the data processing time, which by this invention is of the order of ⅙ of less of that required by the method wherein the particle size distribution is computed from the relationship of the simple $I_t$-versus-$h$ curve of the transmitted light intensity $I_t$ and the parallel light beam scanning position $h$.

It has been found that the actual practice of the present invention in the analysis of particle size distributions of powders of graphite, carborundum, alumina, chromium oxides, luminescent materials, and other substances produced results which coincided well with analysis results obtained by the conventional balance weighing method, whereby the high accuracy afforded by the practice of the present invention is also apparent.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. Apparatus for analyzing the particle size distribution of powder comprising, in combination: a cell with transparent side walls for containing a liquid suspension of a powder sample to be analyzed; means for causing a parallel light beam to be projected parallel to the surface of the liquid suspension to scan the liquid suspension through the transparent walls of the cell downwardly in the depth direction of the suspension; a photoelectric converter for receiving the resulting light transmitted through the liquid suspension and for producing a first electrical output $I$ in accordance with the variable intensity of said transmitted light; said apparatus also including means for detecting the varying scanning position $h$ of the parallel light beam as a linear variable and for producing a second electrical output corresponding to the square root $\sqrt{h}$ of said linear variable; and a rectangular coordinate recorder having a nomographic sheet for plotting said first and second electric outputs $I$ and $\sqrt{h}$ as respective coordinates on said nomographic sheet which comprises one of said coordinates with the scales for direct conversion of the transmitted light intensity into logarithms log $I$ of said values, and the other of said coordinates with the scales of the square root $\sqrt{h}$ of the parallel light beam scanning position corresponding to particle diameter of a sample, whereby the $I$ versus $\sqrt{h}$ curve is transformed to Log $I$ versus $r$ curve, and a particle size distribution curve is obtained by graphical integration as the ratio of the partial area corresponding to the range ($r_1$ to $r_2$) to the total area under a curve of log $I$ versus $\sqrt{h}$.

References Cited
UNITED STATES PATENTS

| | | | |
|---|---|---|---|
| 2,834,247 | 5/1958 | Pickels | 88—14 |
| 3,133,445 | 5/1964 | Richard | 73—432 |
| 3,279,305 | 10/1966 | Muta et al. | 88—14 |
| 3,315,066 | 4/1967 | Muta et al. | 235—151.3 |

RICHARD B. WILKINSON, *Primary Examiner.*

J. W. HARTARY, *Assistant Examiner.*